United States Patent
Lin (10) Patent No.: US 10,281,756 B2
(45) Date of Patent: May 7, 2019

(54) DISPLAY MODULE AND DISPLAY DEVICE (71) Applicant: BOE TECHNOLOGY GROUP CO., LTD., Beijing (CN)

(72) Inventor: She Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/542,058

(22) PCT Filed: Jan. 3, 2017

(86) PCT No.: PCT/CN2017/000031
§ 371 (c)(1),
(2) Date: Jul. 6, 2017

(87) PCT Pub. No.: WO2017/177723
PCT Pub. Date: Oct. 19, 2017

(65) Prior Publication Data
US 2018/0107048 A1 Apr. 19, 2018

(30) Foreign Application Priority Data

Apr. 15, 2016 (CN) .......................... 2016 1 0233252

(51) Int. Cl.
*G02F 1/1333* (2006.01)
(52) U.S. Cl.
CPC .... *G02F 1/133308* (2013.01); *G02F 1/13336* (2013.01); *G02F 2001/133317* (2013.01);
(Continued)
(58) Field of Classification Search
CPC ......... G02F 2001/133328; G02F 2001/133331
See application file for complete search history.

(56) References Cited

U.S. PATENT DOCUMENTS

2012/0204461 A1\* 8/2012 Takeuchi .......... G02F 1/133308
40/737
2013/0265765 A1 10/2013 Liang et al.
(Continued)

FOREIGN PATENT DOCUMENTS

CN 102945644 A 2/2013
CN 103413494 A 11/2013
(Continued)

OTHER PUBLICATIONS

"First office action," CN Application No. 201610233252.8 (dated Apr. 4, 2018).
(Continued)

*Primary Examiner* — Kendrick Hsu
(74) *Attorney, Agent, or Firm* — Womble Bond Dickinson (US) LLP (57) ABSTRACT

A display module and a display device are disclosed. The display module comprises a transparent cover plate, a display panel, and a module frame. The module frame is arranged at the periphery of the display panel. The module frame is fixed to the transparent cover plate. The display panel is fixed to the transparent cover plate through the module frame. The module frame extends towards the transparent cover plate to form a front surface, which does not exceed one of a front surface and a back surface of the transparent cover plate. The front surface of the module frame does not exceed one of the front surface and back surface of the transparent cover plate, so that the front surface of the display module is free from protrusions due to any component, and a flat front surface of the display module is formed.

16 Claims, 2 Drawing Sheets

(52) U.S. Cl.
CPC ............ *G02F 2001/133328* (2013.01); *G02F 2001/133331* (2013.01)

(56) References Cited

U.S. PATENT DOCUMENTS

| | | | | |
|---|---|---|---|---|
| 2014/0211122 | A1* | 7/2014 | Wurzel | G02F 1/133308 349/61 |
| 2016/0109906 | A1* | 4/2016 | Trutna | G02F 1/133308 361/747 |
| 2016/0198578 | A1 | 7/2016 | Du | |
| 2016/0291240 | A1* | 10/2016 | Sugimoto | G02F 1/133606 |
| 2016/0366379 | A1* | 12/2016 | Hickl | G02B 3/08 |

FOREIGN PATENT DOCUMENTS

| | | | |
|---|---|---|---|
| CN | 104392670 | A | 3/2015 |
| CN | 105093628 | A | 11/2015 |
| CN | 105676513 | A | 6/2016 |
| CN | 205539828 | U | 8/2016 |

OTHER PUBLICATIONS

International Search Report and Written Opinion in PCT/CN2017/000031 dated Apr. 7, 2017, with English translation.

\* cited by examiner

DISPLAY MODULE AND DISPLAY DEVICE

RELATED APPLICATIONS

The present application is the U.S. national phase entry of PCT/CN2017/000031, with an international filing date of Jan. 3, 2017, which claims the benefit of Chinese Patent Application 201610233252.8, filed on Apr. 15, 2016, the entire disclosures of which are incorporated herein by reference.

TECHNICAL FIELD

The present disclosure relates to the field of display technology, and particularly to a display module and a display device.

BACKGROUND

Currently, there is an increasing concern for a display device with an extra large screen. In application scenes like a public square, a dispatching center, a surveillance center, a common center, a conference room, a broadcast room, an exhibition room, a party background, a shopping center, there is a common need for an extra large screen, and there is also a requirement for an increased size of the screen. However, due to limitations of processes and product cost, the display screen of a single display module generally is not larger than 60 inches. Therefore, light emitting diodes (LEDs) or tiling is usually used to realize a display device with an extra large screen. Since the display device with an extra large screen which is realized by LEDs generally has a low resolution, the tiling technique has been applied widely. In the tiling technique, display modules are tiled to provide a display device with an extra large screen.

SUMMARY

In a first aspect, an embodiment of the present disclosure provides a display module, comprising a transparent cover plate, a display panel, and a module frame, wherein the module frame is arranged at the periphery of the display panel, the module frame is fixed to the transparent cover plate, the display panel is fixed to the transparent cover plate through the module frame, and the module frame extends towards the transparent cover plate to form a front surface which does not exceed one of a front surface and a back surface of the transparent cover plate.

In the display module of the present embodiment, the front surface of the module frame does not exceed one of the front surface and back surface of the transparent cover plate, so that the front surface of the display module is free from protrusions due to any component, and a flat front surface of the display module is formed. In case display modules are tiled to form a display device, the display device has a clean and flat appearance The transparent cover plate is a transparent glass cover plate or a transparent plastic cover plate. The transparent cover plate is transparent to avoid affecting the display function of the display panel. The transparent cover plate has a predefined strength to protect the display module, especially a display panel, and thus prevents the display panel from scratch and impact. For example, the display panel, e.g., a liquid crystal display panel, is generally very thin and fragile. With the increase in size of the display panel, this phenomenon is increasingly serious. Therefore, the transparent cover plate is provided to protect the display panel. For example, the transparent cover plate is a transparent tempered glass.

In an embodiment of the present disclosure, the module frame and a connecting element between the transparent cover plate and the module frame are located on a same side of the transparent cover plate, and the front surface of the module frame is in flush with one of the front surface and the back surface of the transparent cover plate.

In the display module of the present embodiment, in case the connecting element is arranged between the front surface of the first frame portion and the back surface of the transparent cover plate, the display panel and the module frame can be arranged on a same side of the transparent cover plate. As a result, the front surface of the module frame is in flush with the front surface of the transparent cover plate, and the transparent cover plate forms the front surface of the display module. Since the connecting element is arranged between the inner side of the first frame portion and the outer side face of the transparent cover plate, and the front surface of the module frame is in flush with the front surface of the transparent cover plate, a display module with a flat front surface is formed. Furthermore, in case the connecting element is arranged between the inner side of the first frame portion and the outer side face of the transparent cover plate, the thickness of the display module is reduced. The connecting element is an adhering element like a double-side adhesive tape, a dotted adhesive, a strip-shaped adhesive.

In an embodiment of the present disclosure, the display panel and the module frame are arranged on a same side of the transparent cover plate, and the front surface of the module frame is in flush with the back surface of the transparent cover plate.

In the display module of the present embodiment, the display panel and the module frame are arranged on a same side of the transparent cover plate, the front surface of the module frame is in flush with the back surface of transparent cover plate. As a result, the transparent cover plate forms the front surface of the display module. Namely, the front surface of the display module is formed by a single and complete transparent cover plate. The front surface of the display module is flat without protrusions due to a frame component. In case display modules are tiled to form a display device, the display device has a clean and flat appearance.

In an embodiment of the present disclosure, the module frame comprises a first frame portion, the first frame portion is fixed to the transparent cover plate, and the first frame portion has a flat surface facing the transparent cover plate.

In the display module of the present embodiment, since the first frame portion of the module frame has a flat surface towards the transparent cover plate, the first frame portion and the transparent cover plate contact with each other in a surface contact mode, and this increases the fixing reliability and stability between the module frame and the transparent cover plate.

In an embodiment of the present disclosure, a connecting element between the transparent cover plate and the first frame portion is arranged between the front surface of the first frame portion and the back surface of the transparent cover plate.

In the display module of the present embodiment, in case the connecting element is arranged between the front surface of the first frame portion and the back surface of the transparent cover plate, the display panel and the module frame are arranged on a same side of the transparent cover plate, so that the transparent cover plate forms the front surface of the display module.

In an embodiment of the present disclosure, a connecting element between the transparent cover plate and the first frame portion is arranged between an inner side of the first frame portion and an outer side face of the transparent cover plate.

In the display module of the present embodiment, in case the connecting element is arranged between the inner side of the first frame portion and the outer side face of the transparent cover plate, the thickness of the display module is reduced.

In an embodiment of the present disclosure, the first frame portion is interposed between the display panel and the transparent cover plate.

In the display module of the present embodiment, the first frame portion isolates the display panel from the transparent cover plate. Namely, in a region of the display panel other than a region where the display panel contacts the first frame portion, the display panel is isolated from the transparent cover plate by air. This prevents the display panel from attaching to the transparent cover plate at a localized region, which otherwise would lead to color spots, and thus avoids adversely affecting the display function of the display panel.

In an embodiment of the present disclosure, the module frame further comprises a second frame portion which is perpendicular to the first frame portion, and an outer side face of the second frame portion which is away from the display panel is in flush with the outer side face of the transparent cover plate.

In the display module of the present embodiment, the outer side face of the second frame portion is in flush with the outer side face of the transparent cover plate, so that the outer side face of the display module is substantially flat. This facilitates tiling a plurality of display modules to form a display device, and decreasing the width of tiling gap.

In an embodiment of the present disclosure, the display module further comprises a panel holding element which is configured to fix the display panel between the panel holding element and the module frame, and the panel holding element is connected to the module frame in a detachable manner.

In the display module of the present embodiment, the display panel is fixed between panel holding element and module frame, so that the display panel is fixed more firmly. This prevents display defects due to the fact that the display panel is loosed during the long-time use of the display module. Besides, since the panel holding element is detachably connected to the module frame, the display panel is more easy and convenient to modify and replace, and is favorable for maintaining and replacing the display module. The expression "the panel holding element is detachably connected to the module frame" indicates that these two components are connected with each other by a detachable and/or removable connection manner, such as adhering, buckling, riveting, threaded connection, interference fitting. Besides, the connection between the panel holding element and the module frame can be removed by heating, pulling, pressing, shocking, vibrating, or the like, without destroying and/or damaging, and this is favorable for replacing and recycling the components.

In an embodiment of the present disclosure, a portion of the panel holding element for fixing the display panel has a U shape cross section.

In the display module of the present embodiment, the portion of the panel holding element for fixing the display panel has a bent shape, e.g., a U shape cross section. The U shaped structure is elastic by itself, and thus provides a buffering effect for the display panel in the display module, when the display module is subject to an impact, especially an impact in a normal direction of the display module. This increases the impact resistance of the display panel, and further increases the display quality and lifetime of the display panel.

In an embodiment of the present disclosure, the display module further comprises a fastener, which is configured to connect the panel holding element to the module frame in a detachable manner.

In the display module of the present embodiment, the panel holding element and the module frame are connected by the fastener by any one of adhering, buckling, riveting, threaded connection, interference fitting. For example, the fastener is a pin, screw, bolt, stud, buckle, or the like.

In an embodiment of the present disclosure, the module frame is provided with a first fastener opening, the panel holding element is provided with a second fastener opening, the first fastener opening corresponds to the second fastener opening in position, and the fastener connects the panel holding element to the module frame through the first fastener opening and the second fastener opening.

In the display module of the present embodiment, the panel holding element and the module frame are provided with fastener openings which correspond to each in position, the fastener runs through these fastener openings to connect the panel holding element and the module frame in a detachable manner. In this case, the fastener is implemented as a pin, screw, bolt, or stud. In this way, the module frame and the panel holding element are detachably connected in a simple manner.

In an embodiment of the present disclosure, the fastener is configured to, after connecting the panel holding element to the module frame, not to extend beyond an outer side face of the module frame which is away from the display panel.

In the display module of the present embodiment, in case the panel holding element is connected to the module frame through the fastener, the outer side face of the fastener is in flush with the outer side face of the module frame, or is recessed with respect to the outer side face of the module frame towards a center of the display panel. In this way, an outer side face of the display module is free from protrusions, and this thus facilitates tiling a plurality of display modules to form a tiled display device and decreasing the width of tiling gap.

In an embodiment of the present disclosure, a cushion part is arranged between the display panel and the panel holding element or between the display panel and the module frame.

In the display module of the present embodiment, the cushion part provides a buffering effect for the display panel in a normal direction. This increases the impact resistance of the display panel, and increases the display quality and lifetime of the display panel. The cushion part is made from a material like silicone.

In an embodiment of the present disclosure, the panel holding element comprises a first holding element and a second holding element in this order in a direction away from the display panel, and the display panel is fixed between the first holding element and the module frame.

In the display module of the present embodiment, the display panel is fixed between the first holding element of the panel holding element and the module frame, so that the display panel is firmly fixed. As an example, the first holding element and the display panel contact with each other in a surface contact mode, so that there is a relatively large contact area between them, and the display panel is firmly fixed. As an example, in case the module frame and the panel holding element are provided with a first fastener opening and second fastener opening, respectively, the first fastener opening is arranged in a second frame portion of the module frame, and the second fastener opening is arranged in a first holding element of the panel holding element.

In an embodiment of the present disclosure, the second holding element is recessed with respect to the first holding element in a direction towards a center of the display panel, and the second holding element and the module frame form an accommodating space.

In the display module of the present embodiment, the accommodating space is used for accommodating electrical components in the display module, for example wires, circuit boards, driving circuits. Thereby, these electrical components do not have overlap an effective display region of the display panel in a direction perpendicular to the display panel. This avoids affecting the display function of the display panel. Besides, when a plurality of display modules are tiled, these electrical components do not have overlap the effective display regions of neighboring display panels in the display module, and this decreases the width of tiling gap when the display modules are tiled. In case the display panel in the display module is a liquid crystal display (LCD) panel, the accommodating space is arranged at a side of the LCD panel where a driver IC is arranged, for accommodating a flexible circuit board and a printed circuit board. A terminal of the flexible circuit board is electrically connected to the driver IC, and the other terminal is electrically connected to the printed circuit board. The accommodating space is further configured to accommodate other electrical components. For example, in case display modules are tiled to form a display device, the accommodating space accommodates driving circuits for driving these display modules.

In an embodiment of the present disclosure, the display panel is a transparent display panel.

In the display module of the present embodiment, the display panel is not limited to a specific type, and for example is a LCD, a field emission display (FED), a plasma display (PD), and an organic light emitting diode (OLED) panel. The display panel is transparent, and thus provides new interactive experience for the user.

In a second aspect, an embodiment of the present disclosure provides a display device, which comprises at least two display modules as described above which are tiled.

The display device of the present embodiment has same or similar beneficial effects as the display module as described above, which are not repeated here for simplicity.

It will be appreciated that the above general description and the following detailed description do not intend to limit the present disclosure in any aspect, but are exemplary and illustrative in nature.

BRIEF DESCRIPTION OF THE DRAWINGS

In order to explain the technical solutions in embodiments of the present disclosure more clearly, the drawings to be used in the description of the embodiments will be introduced briefly in the following. Apparently, the drawings described below are only some embodiments of the present disclosure.

The above mentioned drawings have shown explicit embodiments of the present disclosure, and more detailed description of these embodiments will be presented hereinafter. These drawings and description do not intend to limit the scope of the concept of the present disclosure, but to explain ideas of the present disclosure for a person with ordinary skill in the art by referring to specific embodiments.

DETAILED DESCRIPTION OF EMBODIMENTS

Specific embodiments of the present disclosure will be further described hereinafter with reference to the drawings and embodiments. The following embodiments are only used for explaining more clearly the technical solution of the present disclosure rather than limiting the protection scope of the present disclosure.

Reference numerals: 10 display device, 100 display module, 110 transparent cover plate, 120 display panel, 130 module frame, 131 first frame portion, 132 second frame portion, 135 first fastener opening, 140 connecting element, 150 panel holding element, 151 first holding element, 152 second holding element, 155 second fastener opening, 160 fastener, 170 cushion part, 180 accommodating space, 190 flexible circuit board, 192 printed circuit board.

Figure 1:
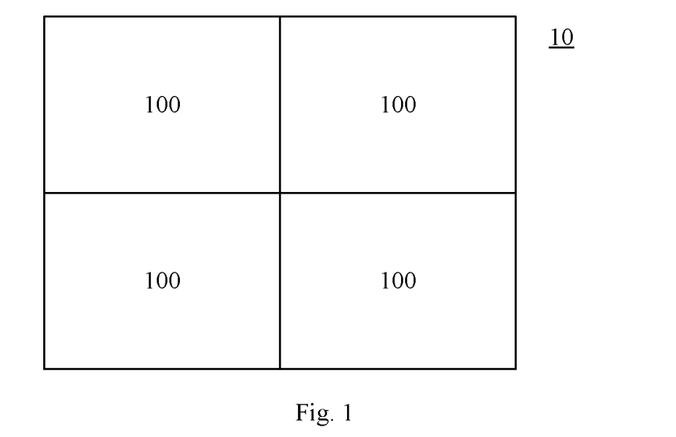
FIG. 1 is a front view for illustrating a display device in an embodiment of the present disclosure.

FIG. 1 shows a front view of a display device in an embodiment of the present disclosure. A display device 10 comprises at least two display modules 100 which are tiled. As shown, the display device 10 comprises 4 display modules 100 which are tiled in a 2×2 matrix. In other embodiments, the display device 10 comprises display modules 100 which are tiled in a n×m matrix, wherein n≥1, m≥2, and n, m are natural numbers. It will be appreciated that the number and tiling manner of the display modules 100 depends on application scenarios.

Figure 2:
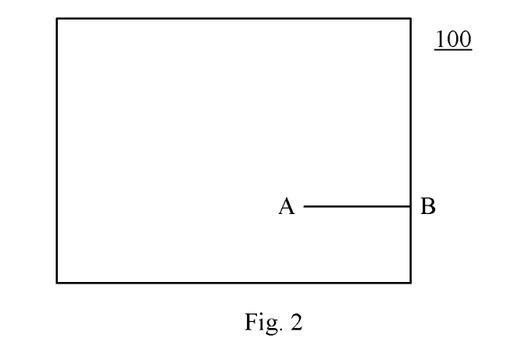
FIG. 2 is a front view for illustrating the display module of FIG. 1.
Figure 3:
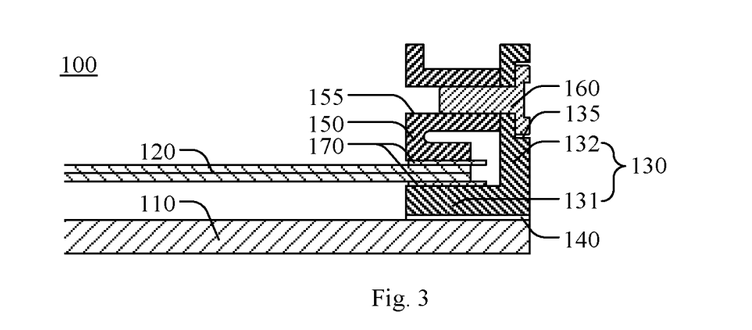
FIG. 3 is a cross-sectional view for illustrating a display module along a line A-B in FIG. 2 in an embodiment of the present disclosure.

The display modules 100 in embodiments of the present disclosure will be described hereinafter with reference to FIG. 2, FIG. 3, FIG. 4 and FIG. 5. FIG. 2 is a front view for one of the display modules 100 in the display device 10 of FIG. 1, and FIG. 3 is a cross-sectional view for the display module along a line A-B in FIG. 2 in an embodiment of the present disclosure. The line A-B in FIG. 2 extends from a point on this display module 100 to a side thereof, in a direction perpendicular to this side.

As shown in FIG. 3, the display module 100 comprises a transparent cover plate 110, a display panel 120, and a module frame 130. The module frame 130 is arranged at periphery of the display panel 120. The module frame 130 is fixed to the transparent cover plate 110. The display panel 120 is fixed to the transparent cover plate 110 through the module frame 130. The display panel 120 and the module frame 130 are arranged on a sane side of the transparent cover plate 110.

The display panel 120 and the module frame 130 are arranged on a same side of the transparent cover plate 110, and the transparent cover plate 110 forms a front surface of the display module 100. Namely, the front surface of the display module 100 is formed by a single and complete the transparent cover plate 110. The front surface of the display module 100 is flat, without protrusions due to a frame component. In case a plurality of display modules 100 are tiled to form the display device 10 as shown in FIG. 1, the display device 10 has a clean and flat appearance.

In an exemplary embodiment, the module frame 130 is arranged at four sides of the display panel 120. In another exemplary embodiment, the module frame 130 is arranged at two opposite sides of the display panel 120. The module frame 130 generally is arranged continuously at periphery of the display panel 120. It is also possible that the module frame 130 is discretely arranged at periphery of the display panel 120.

In an exemplary embodiment, the module frame 130 comprises a first frame portion 131 and a second frame portion 132. The first frame portion 131 is fixed to the transparent cover plate 110, and the first frame portion 131 has a flat surface facing the transparent cover plate 110, as shown in FIG. 3. The first frame portion 131 and the transparent cover plate 110 contact with each other in a surface contact mode, which increases the fixing reliability and stability between the module frame 130 and the transparent cover plate 110.

In an exemplary embodiment, the first frame portion 131 is fixed to the transparent cover plate 110 through a connecting element 140. In case the first frame portion 131 and the transparent cover plate 110 contact with each other in a surface contact mode, a firm bonding between the first frame portion 131 and the transparent cover plate 110 is realized by the connecting element 140. For example, the connecting element is an adhering element like a double-side adhesive tape, dotted adhesive, strip-shaped adhesive. In the present embodiment, a back surface of the transparent cover plate 110 is in flush with a front surface of the module frame 130. For example, the front surface of the transparent cover plate 110 is in flush with the front surface of the first frame portion 131 of the module frame 130.

As shown in FIG. 3, the first frame portion 131 is interposed between the display panel 120 and the transparent cover plate 110. Namely, the first frame portion 131 isolates the display panel 120 from the transparent cover plate 110, so that at a region of the display panel 120 which the first frame portion 131 does not contact, the display panel 120 is spaced apart from the transparent cover plate 110 by e.g., air. This prevents the display panel 120 from attaching to the transparent cover plate 110 at a localized region which otherwise would lead to color spots, and thus avoids adversely affecting the display function of the display panel 120.

In an exemplary embodiment, the second frame portion 132 is perpendicular to the first frame portion 131, and an outer side face of the second frame portion 132 away from the display panel 120 is in flush with an outer side face of the transparent cover plate 110. As shown in FIG. 3, the module frame 130 comprises the first frame portion 131 and the second frame portion 132, and has a "L" shape. The outer side face of the second frame portion 132 is in flush with the outer side face of the transparent cover plate 110, so that the outer side face the display module 100 is substantially flat. This facilitates tiling a plurality of display modules 100 to form the display device 10, and decreasing a width of tiling gap.

In an exemplary embodiment, the display module 100 further comprises a panel holding element 150, which is configured to fix the display panel 120 between the panel holding element 150 and the module frame 130. The panel holding element 150 is detachably connected to the module frame 130. Since the display panel 120 is fixed between the panel holding element 150 and the module frame 130, the display panel 120 is fixed more firmly. This prevents display defects due to the fact that the display panel 120 is loosed during the long-time use of the display module 100. Besides, since the panel holding element 150 is detachably connected to the module frame 130, the display panel 120 is more easy and convenient to modify and replace, and is favorable for maintaining and replacing the display module 100. The expression "the panel holding element 150 is detachably connected to the module frame 130" indicates that these two components are connected with each other by a detachable and/or removable connection manner, such as adhering, buckling, riveting, threaded connection, interference fitting. Besides, the connection between the panel holding element 150 and the module frame 130 can be removed by heating, pulling, pressing, shocking, vibrating, or the like, without destroying and/or damaging, and this is favorable for replacing and recycling the components.

In an exemplary embodiment, a portion of the panel holding element 150 for fixing the display panel 120 has a cross section of a bent shape, e.g., a U shape. For example, as shown in FIG. 3, the panel holding element 150 has a U shaped structure at the bottom. An arm of the U shaped structure is configured to fix the display panel 120 to the module frame 130. The U shaped structure is elastic by itself. In case the display module 100 is subject to an impact, especially an impact in a normal direction of the display module 100, the U shaped structure provides a buffering effect for the display panel 120 in the display module 100. This increases the impact resistance of the display panel 120, and thus increases the display quality and lifetime of the display panel 120.

In an exemplary embodiment, the display module 100 further comprises a fastener 160, which is configured to detachably connect the panel holding element 150 to the module frame 130, as shown in FIG. 3. The panel holding element 150 and the module frame 130 are connected by the fastener 160 by any one of adhering, buckling, riveting, threaded connection, interference fitting. For example, the fastener 160 is a pin, screw, bolt, stud, buckle, or the like.

In an exemplary embodiment, the module frame 130 is provided with a first fastener opening 135, and the panel holding element 150 is provided with a second fastener opening 155. The first fastener opening 135 corresponds to the second fastener opening 155 in position. The fastener 160 connects the panel holding element 150 to the module frame 130 through the first fastener opening 135 and the second fastener opening 155, as shown in FIG. 3. The fastener 160 detachably connects the panel holding element 150 to the module frame 130 through the first and second fastener openings 135, 155. The fastener 160 is implemented as a pin, screw, bolt, or stud. In this way, the module frame 130 and the panel holding element 150 are detachably connected in a simple manner.

In an exemplary embodiment, after the panel holding element 150 is connected to the module frame 130, the fastener 160 does not extend beyond an outer side face of the module frame 130 away from the display panel 120, i.e., a right side face of the second frame portion 132 in FIG. 3. In case the panel holding element 150 is connected to the module frame 130 through the fastener 160, an outer side face of the fastener 160 is in flush with the outer side face of the module frame 130, or is recessed with respect to the outer side face of the module frame 130 in a direction towards a center of the display panel 120. In this way, an outer side face of the display module 100 is free from protrusions, and this thus facilitates tiling a plurality of display modules 100 to form a tiled display device 10 and decreasing the width of tiling gap.

In an exemplary embodiment, a cushion part 170 is arranged between the display panel 120 and the panel holding element 150, and/or between the display panel 120 and the module frame 130, as shown in FIG. 3. The cushion part 170 provides buffering for the display panel 120 in the normal direction, thus increasing the impact resistance of the display panel 120, and increasing the display quality and lifetime of the display panel 120. The cushion part 170 is made from an elastic material like silicone.

Figure 4:
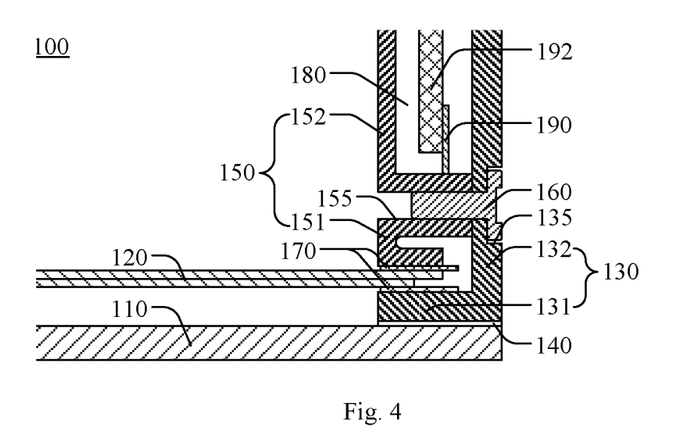
FIG. 4 is another cross-sectional view for illustrating a display module along a line A-B in FIG. 2 in an embodiment of the present disclosure.

FIG. 4 is another schematic cross-sectional view along the line A-B in FIG. 2. In the display module 100 shown in FIG. 4, the same components are labeled with the same reference numerals as those in the display module 100 shown in FIG. 3.

In an exemplary embodiment, in a direction away from the display panel 120, the panel holding element 150 comprises a first holding element 151 and a second holding element 152 in this order, and the display panel 120 is fixed between the first holding element 151 and the module frame 130, as shown in FIG. 4. Since the display panel 120 is fixed between the first holding element 151 of the panel holding element 150 and the module frame 130, the display panel 120 is firmly fixed. As an example, the first holding element 151 and the display panel 120 contact with each other in a surface contact mode, so that there is a relatively large contact area between them, and the display panel 120 is firmly fixed. As an example, in case the module frame 130 is provided with the first fastener opening 135 and the panel holding element 150 is provided with the second fastener opening 155, the first fastener opening 135 is arranged in the second frame portion 132 of the module frame 130, and the second fastener opening 155 is arranged in the first holding element 151 of the panel holding element 150.

As shown, a portion of the first holding element 151 for fixing the display panel 120 has a U shape cross section, thus providing a buffering effect for the display panel 120 in the display module 100. Reference is made to the panel holding element 150 which has a U shaped structure at the bottom as shown in FIG. 3, which is not repeated here for simplicity.

In an exemplary embodiment, the second holding element 152 is recessed with respect to the first holding element 151 in a direction towards a center of the display panel 120, and the second holding element 152 and the module frame 130 form an accommodating space 180, as shown in FIG. 4.

The accommodating space 180 is available for accommodating electrical components in the display module 100, for example wires, circuit boards, driving circuits. Thereby, these electrical components do not have overlap an effective display region of the display panel 120 in a direction perpendicular to the display panel 120. This avoids affecting the display function of the display panel 120. Besides, when a plurality of display modules 100 are tiled, these electrical components do not have overlap the effective display regions of neighboring display panels 120 in the display module 100, and this decreases the width of tiling gap when the display modules 100 are tiled.

In case the display panel 120 in the display module 100 is a LCD panel, the accommodating space 180 is arranged at a side of the LCD panel where a driver IC is arranged, for accommodating a flexible circuit board 190 and a printed circuit board 192. A terminal of the flexible circuit board 190 is electrically connected to the driver IC, and the other terminal is electrically connected to the printed circuit board 192. As shown in FIG. 4, the display panel 120 comprises an upper substrate and a lower substrate which are boned with each other, and at the right side of the display panel 120, the upper substrate extends beyond the lower substrate for arranging the driver IC (not shown). For example, the upper substrate is an array substrate, and the lower substrate is a color film substrate. The accommodating space 180 is arranged at the right side of the display panel 120 for accommodating the flexible circuit board 190 and the printed circuit board 192.

The accommodating space 180 is further configured to accommodate other electrical components. For example, in case the display modules 100 are tiled to form the display device 10, the accommodating space 180 accommodates driving circuits for driving these display modules 100.

In the embodiments shown in FIG. 3 and FIG. 4, the module frame 130 extends towards the transparent cover plate 110 to form a front surface, and the front surface does not exceed the back surface of the transparent cover plate 110. For example, the module frame 130 and the connecting element 140 between the transparent cover plate 110 and the module frame 130 are arranged at a same side of the transparent cover plate 110, and the front surface of the module frame 130 is in flush with the back surface of the transparent cover plate 110. In another example, the display panel 120 and the module frame 130 are arranged on a same side of the transparent cover plate 110, and the front surface of the module frame 130 is in flush with a back surface of the transparent cover plate 130.

Figure 5:
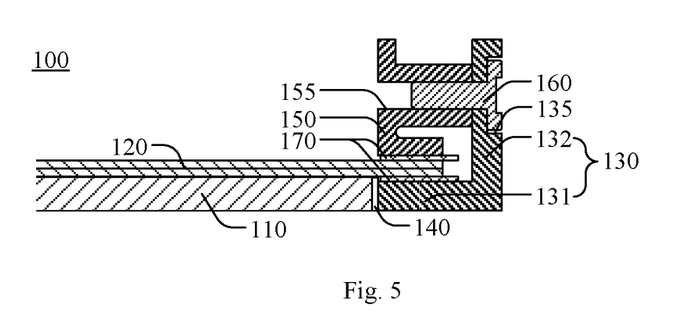
FIG. 5 is a cross-sectional view for illustrating a display module along a line A-B in FIG. 2 in an embodiment of the present disclosure.

FIG. 5 is another schematic cross-sectional view along the line A-B in FIG. 2. In the display module 100 shown in FIG. 5, the same components are labeled with the same reference numerals as those in the display module 100 shown in FIG. 3. The embodiment shown in FIG. 5 differs from the embodiment shown in FIG. 3 in that, the module frame 130 is fixed to a side face of the transparent cover plate 110 through the connecting element 140, and the front surface of the transparent cover plate 110 is in flush with the front surface of the module frame 130.

As shown, the connecting element 140 is arranged between the outer side face of the transparent cover plate 110 and an inner side of the first frame portion 131 of the module frame 130, for providing a firm bonding between the transparent cover plate 110 and the module frame 130. In the present embodiment, the front surface of the transparent cover plate 110 is in flush with the front surface of the module frame 130, especially the front surface of the first frame portion 131 of the module frame 130. Thereby, the front side (i.e., the front surface) of the display module 100 is flat without protrusions due to a frame component. In case the display modules 100 are tiled to form a display device, the display device has a clean and flat appearance.

As shown, the transparent cover plate 110 contacts the display panel 120. However, it will be appreciated that the back surface of the transparent cover plate 110 can be separate from a front surface of the display panel 120, to prevent the display panel 120 from attaching to the transparent cover plate 110 at a localized region which otherwise would lead to color spots.

In the embodiment shown in FIG. 5, the module frame 130 extends towards the transparent cover plate 110 to form the front surface, and the front surface does not exceed the front surface of the transparent cover plate 110. For example, the module frame 130 and the connecting element 140 between the transparent cover plate 110 and the module frame 130 are arranged at a same side of the transparent cover plate 110, and the front surface of the module frame 130 is in flush with the front surface of the transparent cover plate 110.

In an exemplary embodiment, the display panel 120 is a transparent display panel. The display panel 120 is not limited to a specific type, and for example is a LCD, a field emission display, a plasma display, and an organic light emitting diode panel. The display panel 120 is transparent, and thus provides new interactive experience for the user. Generally, in applications of a transparent display, it is desired to utilize the normally white mode of the LCD (i.e., the LCD stays in a transparent state when no voltage is applied). However, it will be appreciated that the display panel 120 of the display module 100 can be opaque.

In an exemplary embodiment, the transparent cover plate 110 is a transparent glass cover plate or a transparent plastic cover plate. The cover plate 110 is transparent to avoid affecting the display function of the display panel 120. The transparent cover plate 110 has a predefined strength to protect the display module 100, especially the display panel 120, and prevent the display panel 120 from scratch and impact. The transparent LCD panel 120 is generally very thin and fragile. With the increase in size of the transparent LCD panel 120, this phenomenon is increasingly serious. Therefore, the transparent cover plate 110 is provided to protect the display panel 120. For example, the transparent cover plate 110 is a transparent tempered glass.

A display device 10 which is tiled from at least two the display modules 100 in embodiments of the present disclosure has been described with reference to FIG. 1. It will be appreciated that the neighboring display module 100 can be tiled in a manner known in the art. For example, neighboring the display module 100 can be tiled from the manner as described above for connecting the module frame 130 and the panel holding element 150.

The display module 100 according to embodiments of the present disclosure has been described with reference to FIG. 2, FIG. 3, FIG. 4, and FIG. 5. In case the display panel 120 of the display module 100 is the LCD panel 120, the LCD panel 120 is further provided with a back light module. It will be appreciated that in an exemplary embodiment, one or more back light modules together provide back light for at least two LCD panels 120. For example, the display device 10 is constructed into a box, the display modules 100 are tiled and arranged on a front surface of the box, one or more back light modules are arranged on four side faces of the box which are adjacent with the front side, and each back light module comprises a light source and a light guide plate. Alternatively, in another exemplary embodiment, each of the display panels 120 has its own back light module and thus independently provides back light.

It will be appreciated that the module frame 130 and the panel holding element 150 can be made from any suitable material, e.g., a metal or plastic.

A display module and a display device which is tiled from the display module have been disclosed. The display module comprises a transparent cover plate, a display panel, and a module frame. The module frame is arranged at the periphery of the display panel, the module frame is fixed to the transparent cover plate, the display panel is fixed to the transparent cover plate through the module frame, and the display panel and the module frame are arranged on a same side of the transparent cover plate. Since the display panel and the module frame are arranged on a same side of the transparent cover plate, the front surface of the display module is flat without protrusions due to a frame component. The display device which is tiled from a plurality of display modules has a clean and flat appearance.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A display module, comprising a transparent cover plate, a display panel, and a module frame,
    wherein the module frame is arranged at the periphery of the display panel;
    the module frame is fixed to the transparent cover plate;
    the display panel is fixed to the transparent cover plate through the module frame,
    wherein the module frame includes a first frame portion and a second frame portion, the first frame portion is parallel to a front surface of the transparent cover plate, and the second frame portion extends upwards from the first frame portion and is perpendicular to the front surface of the transparent cover plate,
    wherein the display module further comprises a panel holding element for fixing the display panel, the panel holding element is located above the periphery of the display panel and connected to an inner side surface of the second frame portion which is adjacent to the display panel in a detachable manner,
    wherein the display panel is fixed between the first frame portion and the panel holding element.

2. The display module of claim 1, wherein an outer side surface of the second frame portion opposite to the inner side surface thereof is in flush with an outer side surface of the transparent cover plate in a vertical direction,
    wherein the module frame and a connecting element between the transparent cover plate and the module frame are located on a same side of the transparent cover plate.

3. The display module of claim 1, wherein the display panel and the module frame are arranged on a same side of the transparent cover plate, and an outer side surface of the second frame portion opposite to the inner side surface thereof is in flush with an outer side surface of the transparent cover plate in a vertical direction.

4. The display module of claim 1, wherein the first frame portion is fixed to the transparent cover plate, and has a flat surface facing the transparent cover plate.

5. The display module of claim 4, wherein a connecting element between the transparent cover plate and the first frame portion is arranged between a front surface of the first frame portion and a back surface of the transparent cover plate.

6. The display module of claim 4, wherein the first frame portion is interposed between the display panel and the transparent cover plate.

7. The display module of claim 1, wherein a front surface of the first frame portion is flush with the front surface of the transparent cover plate in a horizontal direction,
    wherein a connecting element between the transparent cover plate and the first frame portion is arranged between an inner side surface of the first frame portion and an outer side surface of the transparent cover plate.

8. The display module of claim 1, wherein a portion of the panel holding element for fixing the display panel has a U shape cross section.

9. The display module of claim 1, wherein the display module further comprises a fastener, which is configured to connect the panel holding element to the inner side surface of the second frame portion which is adjacent to the display panel in a detachable manner.

10. The display module of claim 9, wherein the second frame portion of the module frame is provided with a first fastener opening, the panel holding element is provided with a second fastener opening, the first fastener opening corresponds to the second fastener opening in position, and the fastener connects the panel holding element to the module frame through the first fastener opening and the second fastener opening.

11. The display module of claim 9, wherein the fastener is configured to, after connecting the panel holding element to the module frame, not to extend beyond the outer side surface of the second frame portion which is away from the display panel.

12. The display module of claim 1, wherein a cushion part is arranged between the display panel and the panel holding element or between the display panel and the module frame.

13. The display module of claim 1, wherein the panel holding element comprises a first holding element and a second holding element in this order in a direction away from the display panel, and the display panel is fixed between the first holding element and the first frame portion.

14. The display module of claim 13, wherein the second holding element is recessed with respect to the first holding element in a direction towards a center of the display panel, and the second holding element and the second frame portion of the module frame form an accommodating space.

15. The display module of claim 1, wherein the display panel is a transparent display panel.

16. A display device, comprising at least two display modules of claim 1 which are tiled.

* * * * *